United States Patent
Hippeläinen

(10) Patent No.: US 6,614,797 B1
(45) Date of Patent: Sep. 2, 2003

(54) METHOD FOR PACKET SWITCHED DATA TRANSMISSION

(75) Inventor: Leo Hippeläinen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/436,102

(22) Filed: Nov. 8, 1999

Related U.S. Application Data

(63) Continuation of application No. PCT/FI98/00399, filed on May 12, 1998.

(30) Foreign Application Priority Data

May 13, 1997 (FI) .................................................. 972041

(51) Int. Cl.[7] .............................................. H04L 12/56
(52) U.S. Cl. ...................... 370/410; 370/278; 370/236
(58) Field of Search ................................ 370/410, 277, 370/229, 474, 394, 345

(56) References Cited

U.S. PATENT DOCUMENTS

| | | | | |
|---|---|---|---|---|
| 4,703,475 A | * | 10/1987 | Dretzka et al. | 370/394 |
| 4,951,278 A | * | 8/1990 | Biber et al. | 370/474 |
| 5,018,136 A | | 5/1991 | Gollub | 370/60.1 |
| 5,115,431 A | | 5/1992 | Williams et al. | 370/94.1 |
| 5,285,442 A | * | 2/1994 | Iwamura et al. | 370/234 |
| 5,361,372 A | * | 11/1994 | Rege et al. | 370/229 |
| 5,444,707 A | | 8/1995 | Cerna et al. | 370/94.1 |
| 5,483,671 A | | 1/1996 | Helm et al. | 455/51.2 |
| 5,703,875 A | | 12/1997 | Burnett | 370/381 |
| 5,742,588 A | * | 4/1998 | Thornberg et al. | 370/236 |
| 6,046,993 A | * | 4/2000 | Åkerberg | 370/345 |
| 6,229,802 B1 | * | 5/2001 | Hippelainen | 370/349 |
| 6,317,418 B1 | * | 11/2001 | Raitola et al. | 370/277 |

FOREIGN PATENT DOCUMENTS

| | | | |
|---|---|---|---|
| WO | 95/21497 | 8/1995 | H04L/12/56 |
| WO | 97/34392 | 9/1997 | H04L/12/56 |
| WO | 97/38511 | 10/1997 | H04L/12/64 |

* cited by examiner

*Primary Examiner*—Wellington Chin
*Assistant Examiner*—Jamal Fox
(74) *Attorney, Agent, or Firm*—Squire, Sanders & Dempsey L.L.P.

(57) ABSTRACT

The invention relates to packet-switched transmission of calls and particularly to packet-switched transmission of calls on circuits between a telecommunication network and base stations from the base stations toward the network. The reduce the maximum delays and the variation in the transmission times of call packets, control packets that contain signalling information on the data transmission network are separated from the call packets in the network node in the present method, information on the arrival rate of the call packets is maintained, the duration of the control packet that is to be sent next is calculated (22), the interval to the reception of the next call packet is defined (23), the duration is compared (24) with the interval, and if the duration is shorter than or equal to the interval, the control packet is sent (25), and if the duration is longer than the interval, the control packet is put (27) in a transmission queue, it is waited until said call packet has been received, and the packet is then forwarded substantially immediately.

9 Claims, 3 Drawing Sheets

METHOD FOR PACKET SWITCHED DATA TRANSMISSION

This is a continuation of PCT/FI98/00399 filed May 12, 1998.

BACKGROUND OF INVENTION

The invention relates to packet-switched transmission of calls and particularly to packet-switched transmission of calls on circuits between a telecommunication network and base stations from the base stations toward the network in a mobile telephone system in which a call is transferred as data packets at even intervals and in which a carrier wave of the radio path is employed by using time division.

In most digital mobile telephone systems the carrier wave of the radio path is divided between several users by using, for example, a TDMA (Time Division Multiple Access) or CDMA (Code Division Multiple Access) method. The common feature of the methods is that a different channel is allocated for each call, and that the call is divided into call packets of a certain length and the packets are transferred on different channels in frames transmitted in succession on the carrier wave of the radio path. A frame comprises several channels, and the time needed to transmit a frame is constant. In the TDMA method, where a frame consists of time channels that are successive with respect to time, packets associated with one and the same call are received at the base station at an interval of the duration of the transmission of a frame.

On the circuits of a network infrastructure, calls are usually transmitted using a circuit-switched system, whereby a different transmission channel, or even a different channel in each direction, is allocated for signalling and for each call. In a circuit-switched system a channel remains allocated even if nothing is transmitted, whereby the efficiency on a 64 kbit/s transmission connection is poor. Further, in a circuit-switched system the network capacity will be abruptly finished as the load increases, whereas in a packet-switched network an increase in the load appears as a reduction in the transmission rate and deterioration of the quality of the connection.

In the known packet-switched networks, packets are usually forwarded in the order of arrival and/or generation. The packets may then have to queue in a network node, if the transmission of a preceding packet is still in progress. Unanticipated queuing of a varying length causes variation in the packet transmission times and prolongs the maximum transmission delay. The variation in the packet transmission times is particularly harmful where speech transmission is concerned, since the quality of speech is impaired by the variation in the transmission times. In addition, in speech transmission it is important that the maximum delays are short.

If a packet-switched network node receives packets from a lower-rate transmission channel and forwards them to a higher-rate transmission channel, some of the advantages brought about by the, higher-rate transmission channel may be lost in waiting for the termination of the transmission of a preceding packet. However, it should be possible to forward particularly speech call packets immediately after they have been received, so that the packet transmission times would not vary because of variation in the waiting times and so that the maximum delay caused by the waiting times would be as short as possible and high-quality speech transmission could thus be guaranteed.

The above problems, i.e. the variation in the transmission delays of the packets caused by the waiting and the increase in the length of the maximum delays, can be overcome, for example, by transferring the packets by emulating circuit-switching, i.e. by allocating a separate channel or channels for them. The problems in this solution are the same as in a circuit-switched solution, i.e. capacity is allocated although it may not be needed, and as the load increases the capacity will be abruptly finished.

Another way of levelling the transmission delays of the packets in the packet-switched network is to buffer a sufficient number of packets at the receiving end, so that any variation in the transmission delays can be levelled. The problem is that real-time transmission of speech does not allow large buffering: in a public safety and security call, for example, the delay must be less than 400 milliseconds. In the Internet the speech-transmitting software uses large buffering, for a delay of a couple of seconds is irrelevant there in speech transmission. Since speech must be put through as quickly as possible in a system transmitting real-time speech, the buffer must be very short, and so buffering cannot be relied on to level the transmission delays. Further, the buffering increases the maximum delay of the packet transmission time.

BRIEF DESCRIPTION OF INVENTION

The object of the present invention is to provide a method and a network node by which the maximum delay of the call packets and the variation in the transmission times can be reduced. The object is achieved by a packet-switched data transmission method of the invention, in which call packets are separated from control packets containing signalling information on the data transmission network and which is characterized by maintaining information on the arrival rate of the call packets; calculating the duration of the transmission of the control packet that is to be sent next; defining the interval to the reception of the next call packet; comparing the duration with the interval, and if the duration is shorter than or equal to the interval, transmitting the control packet, and if the duration is longer than the interval, putting the control packet in a transmission queue, waiting until said call packet has been received, and subsequently forwarding the call packet substantially immediately.

Substantially immediately means that the packet is forwarded immediately after the measures necessary in receiving a packet have been taken and the packet is ready for forwarding. The measures include, for example, detecting whether the packet is a call packet, possibly checking the address, and receiving the packet in full before forwarding it if the packet is received from a lower-rate channel than it is transmitted to.

The invention also relates to a network node that can be utilized in the method of the invention. The network node of the packet-switched transmission network of the invention, to which there leads at least one incoming channel and from which there leads at least one outgoing channel and which comprises reception means for receiving packets, transmission means for transmitting packets toward a destination address, and a buffer for buffering the received packets, the reception means being arranged to separate call packets from control packets that contain signalling information on the data transmission network, is characterized by the node further comprising memory means for storing the information indicating the arrival rate of the call packets, a time counter for defining the interval to the reception of the next call packet, calculating means for calculating the duration of the transmission of the control packet to be sent next, comparison means for comparing the interval and the duration, and a transmission order controller for putting the control packets in a transmission queue in the buffer and for transmitting said next call packet next, if the duration is longer than the interval.

The invention is based on the idea that before the transmission of a control packet, it is checked whether there is enough time to send the packet before the reception of the next call packet. The received call packet can thus be forwarded immediately after it has been received.

The advantage of the method and network node of the invention is that the same transmission channel can be used for the transmission of both call packets and control packets that contain signalling information without that the quality of real-time speech transmission is impaired, since the call packets always have access to the transmission channel without delay. The transmission capacity can thus be used efficiently and no extra delay of a varying length occurs in the call transmission because of signalling internal to the system.

In a preferred embodiment of the invention the control packets are transmitted in the order of priority. The advantage is that the important control packets can be delivered as quickly as possible.

Further, in a preferred embodiment of the invention that can be used when there are several outgoing channels, the control packets are not transmitted on a certain channel, but an outgoing channel on which there is enough time to send the packet is found for each control packet. The control packets can thus be transmitted as soon as possible.

The preferred embodiments of the method and network node of the invention appear from the attached dependent claims 2 to 5 and 7 to 9.

BRIEF DESCRIPTION OF FIGURES

In the following the invention will be described in greater detail by means of preferred embodiments and with reference to the attached drawings, in which.

DETAILED DESCRIPTION OF INVENTION

In the following the invention will be described by way of an example in a packet-switched telecommunication network that is designed to act as a transmission network of a digital radio network according to the TETRA standard. (Trans-European Trunked Radio) defined by the ETSI (European Telecommunications Standards Institute). The TETRA standard defines, for example, a radio interface and other interfaces, such as an interface to another TETRA network. The internal structure of the transmission network, however, is not defined in the TETRA standard. The invention, however, is not limited to radio networks or other wireless networks, but it will be obvious to a person skilled in the art that the invention can be applied to other data transmission systems both in networks based on wireless data transmission and in fixed networks.

Figure 1:
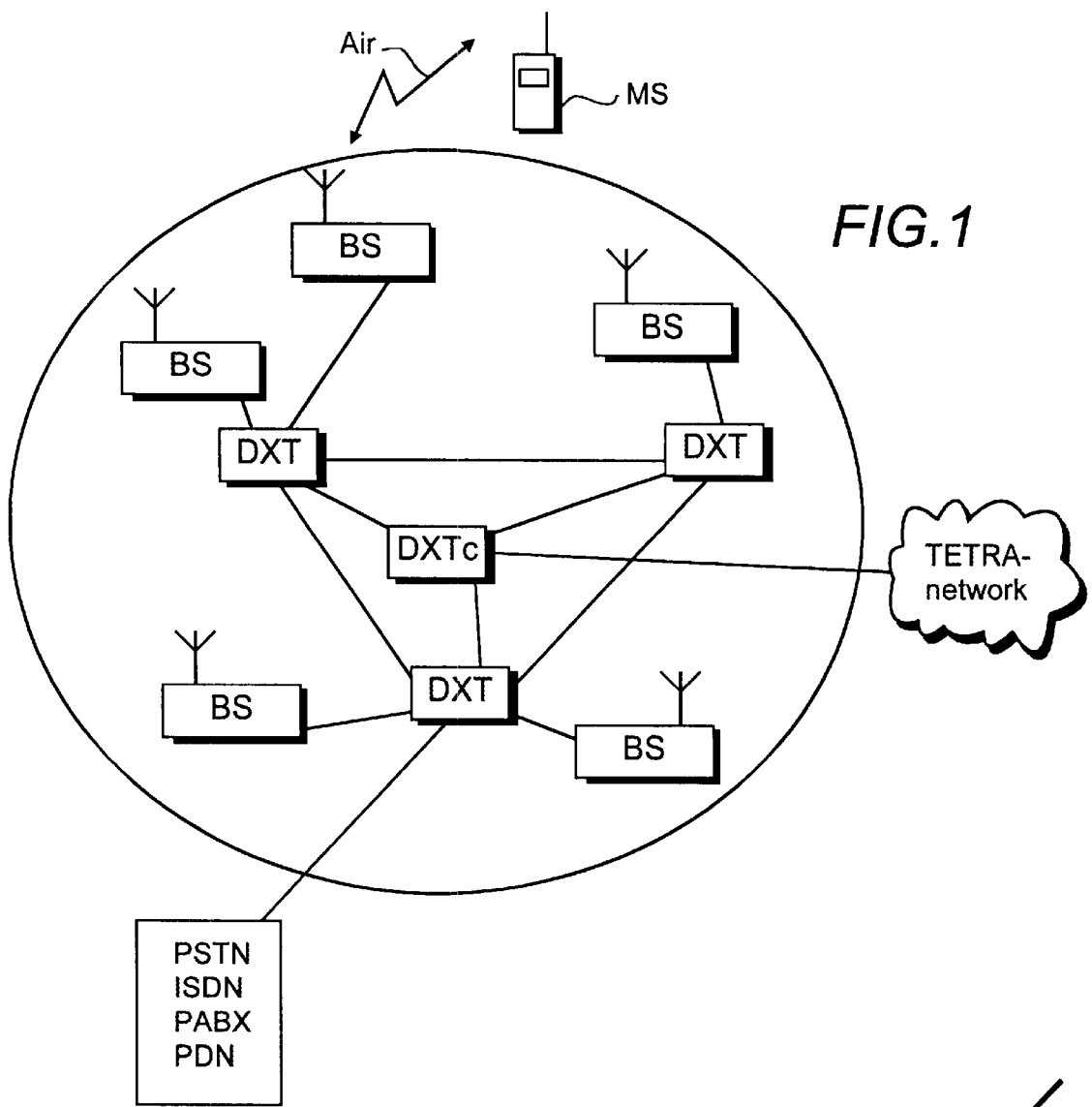
FIG. 1 is a block diagram of a data transmission network of the TETRA system.

FIG. 1 shows an exemplary structure of a TETRA transmission network. A Mobile Station MS (Mobile Subscriber) communicates with a Base Station BS over the radio path Air. The radio interface Air according to the TETRA standard is based on a 4-channel time division multiplexed carrier wave whose bandwidth is 25 kHz. On the carrier wave are transmitted successive frames, each of which comprises four time slots, or time channels, both in the uplink and in the downlink direction. A separate time slot is usually allocated for each data transmission connection, but the TETRA standard allows the allocation of even a plural number of time slots for one connection. In a system that follows the TETRA standard, the transmission of one TDMA frame takes about 60 ms, so about 15 ms are reserved for each time slot. A base station may also have several carrier waves.

Each base station BS is connected by a circuit to a Digital Exchange DXT for TETRA of the fixed transmission network. The TETRA exchanges DXT are connected to other exchanges DXT and to a Digital Central Exchange DXTc for TETRA by a fixed circuit, the DXTc being an exchange to which are connected other exchanges DXT and/or other central exchanges DXTc so as to provide alternative paths for the traffic. The interface to another TETRA network is here arranged in the central exchange DXTc, but it can also be located in the other exchanges DXT. The external interfaces, defined by the standard, to the Public Switched Telephone Network PSTN, the Integrated Services Digital Network ISDN, the Private Automatic Branch Exchange PABX and the Packet Data Network PDN are here located in one exchange DXT, but they can also be arranged, for example, in every exchange. The TETRA transmission network also comprises other interfaces and peripheral units, which are not shown in the figure. They include, for example, network management systems and dispatcher systems.

Figure 2:
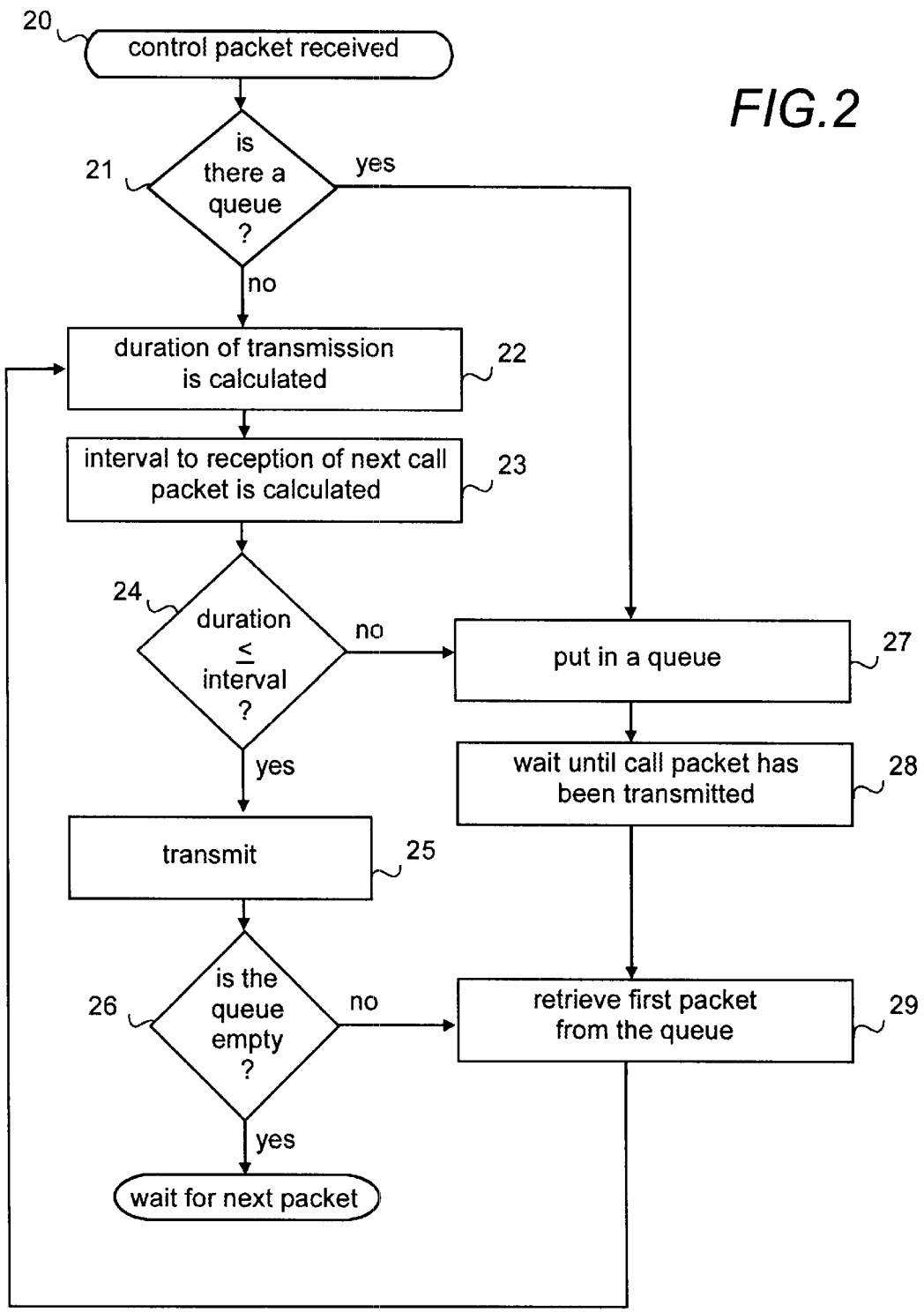
FIG. 2 is a flow diagram of a first preferred embodiment of a method according to the invention.

FIG. 2 is a flow diagram of a first preferred embodiment of the invention. In the prior art, different types of packets are separated by the identification data contained therein. The control packets containing signaling information are here separated from the call packets so that the call packets can be forwarded substantially immediately. The separation is based, for example, on the identification data contained in the packet. The identification data, for example, indicates the data transmission connection that the packet is associated with, and the data is used, for example, to route the packet.

The method comprises maintaining information on the arrival rate of the packets, i.e. how long after a received call packet the next call packet is received. The arrival rate depends on the synchronization and load of the transmitting network node or the allocation situation of the channels of the carrier wave. The arrival rate will be described in greater detail in connection with FIG. 3. A received packet is a packet that is ready to be forwarded. The time needed for the reception, and any necessary processing of the packet are taken into account in the arrival rate. An example for the processing of the packet is the conversion of a packet received from the radio path at the base station into a packet that can be transferred in the transmission network. The arrival rate at a one-carrier-wave base station BS is about 15 ms in a system according to the TETRA standard, if all the time slots are allocated, and when, for example, two time slots are allocated, the reception of the call packets cyclically follows the arrival rate, according to which call packets are received alternately at an interval of about 15 ms and about 45 ms. Correspondingly, packets transmitted by the base station are received at the same rate in the TETRA exchange DXT.

When a control packet is received 20, it is checked 21 whether there are control packets in a queue. If there is no queue, the duration of the transmission of the control packet is calculated 22. The duration can be calculated since the size of the packet and the rate of the transmission channel are known. After step 22, the interval to the reception of the next call packet is defined 23. The interval can be defined since the arrival rate of the call packets and the time left before the reception of the next call packet are known. When the above times have been defined, they are compared. If the duration of the transmission is 24 shorter than or as long as the interval, the control packet is sent 25. It is then checked 26 whether the queue of control packets is empty. If a new control packet has been received during the interval between the reception and the transmission of the control packet (steps 20 to the queue is not empty. The packet that is the first in the queue is then retrieved 29, and the routine returns to step 22, i.e. the duration of the transmission of the control packet retrieved from the queue is calculated, and the routine then proceeds as described above. If in step 26 the queue of control packets is empty, the next packet will bee waited for.

If in step 24 the duration of the transmission of the control packet is longer than the interval to the reception of the next call packet, the control packet is put 27 in a queue. It is thus ensured that the call packet can be transmitted without hindrance. When the control packet has been put in the queue, it is waited until the call packet has been sent 28, and the packet that is the first in the queue of control packets is then retrieved 29, and the routine then returns to step 22, where the duration of the transmission of the control packet is calculated. If other control packets are received during the interval between the reception of the control packet and the retrieval of the first packet from the queue (steps 20, 21, 23, 24, 27, 28 and 29), these packets are also put in the queue of control packets, from which the packets in the first preferred embodiment are sent in the order of arrival. If the control packets have different priorities, they are put in the queue in the order of priority, yet in such a way that the control packets with the same priority are in the order of arrival. Further, the control packets with priorities need not be put in the queue in the buffer in the order of priority, but packets can also be picked from the queue for transmission in the order of priority. The priorities ensure that the more urgent control messages are transmitted before the less important control messages.

If, when a control packet is received in step 20, there are already other control packets in a queue or a call or control packet is being sent, the control packet is put 27 in the queue. If the control packet is put in the queue because another control packet is being sent, it will be retrieved 29 from the queue when it is checked 26, after the transmission of the preceding control packet, whether the queue is empty. If the control packet is put in the queue because a call packet is being sent, it is waited 28 until the call packet has been sent, and the control packet is then retrieved 29 for transmission, and the routine then returns to step 22. If the control packet is put in the queue because there are already other control packets in the queue, it will be retrieved 26 for transmission when it is checked 26, after the transmission 25 of the preceding control packet, whether the control packet queue is empty. The method thus takes care that no packets remain in the control packet queue.

Figure 3:
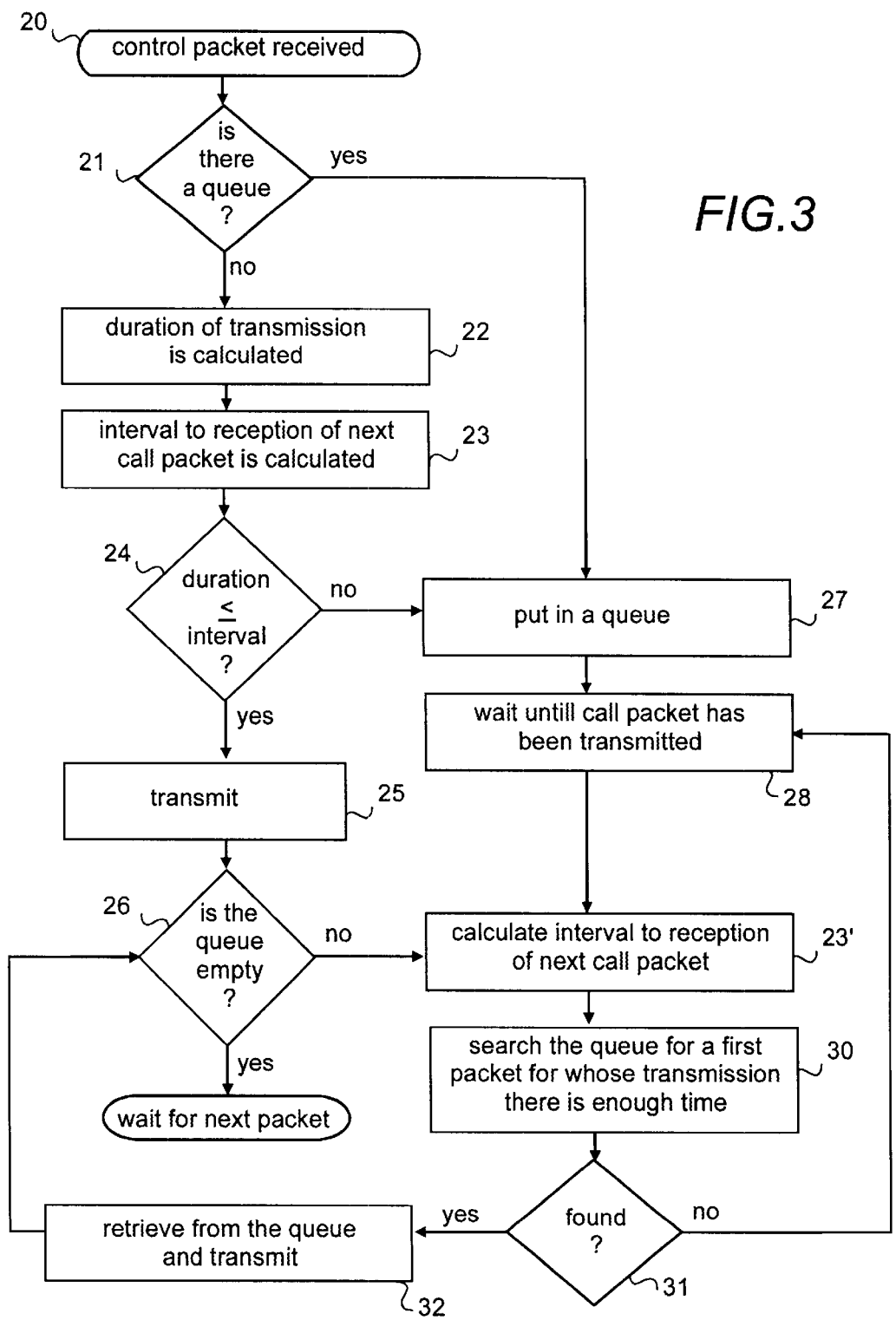
FIG. 3 is a flow diagram of a second preferred embodiment of the method according to the invention.

FIG. 3 is a flow diagram of a second preferred embodiment of the invention. It differs from the first preferred embodiment only in respect of the emptying of the control packet queue, i.e. steps 20, 21, 22, 23, 24, 25, 26, 27 and 28 are the same.

When a control packet is received 20, it is checked 21 whether there are control packets in a queue. If there is no queue, the duration of the transmission of the control packet is calculated 22, the interval to the receptions of the next call packet is defined 23, and the times are compared as described above in connection with FIG. 2. If the duration of the transmission is 24 shorter than or as long as the interval, the control packet is sent 25. It is then checked 26 whether the control packet queue is empty. If the control packet queue is empty, the next packet will be waited for. If a new control packet has been received during the interval between the reception and the transmission of the control packet (steps 20 to 25), the queue is not empty. The interval to the reception of the next call packet is then defined 23'. The interval can be defined since the arrival rate of the call packets and the time left before the reception of the next call packet are known. The queue is then searched for 30 the first control packet in the order of arrival for the transmission of which the interval is sufficiently long. If such a control packet is found 31, it is retrieved from the control packet queue and subsequently transmitted 32. The routine then returns to step 26, where it is checked whether the control packet queue is empty, and the routine then proceeds as described above depending on the result.

If no control packet for the transmission of which the interval is sufficiently long is found 31 in the queue, it is waited until the next call packet has been sent 28, and the routine then proceeds from step 23' onward, i.e. the interval to the reception of the next call packet is defined.

If in step 24 the duration of the transmission of the control packet is longer than the interval to the reception of the next call packet, the control packet is put in a queue 27. It is thus ensured that the call packet can be sent without hindrance. When the control packet has been put in the queue, it is waited 28 until the call packet has been sent, and the routine then proceeds from step 23' onward, i.e. the interval to the reception of the next call packet is defined. If other control packets are received during the interval from the reception of the control packet to the retrieval of the first packet from the queue (steps 20, 21, 22, 23, 24, 27, 28, 23', 30, 31 and 32), these packets will also be put in the control packet queue.

If, when a control packet is received in step 20, there are already other control packets in a queue or a call or control packet is being sent, the control packet is put 27 in the queue. If the control packet is put in the queue because another control packet is being sent, it may be retrieved from the queue and transmitted 32 when it is checked 26, after the transmission of the preceding control packet, whether the queue is empty, the interval to the reception of the next call packet is defined 23', and the queue is searched for 30 the first control packet for the transmission of which there is enough time. If the control packet is put in the queue because a call packet is being sent, it is waited 28 until the call packet has been sent, and the routine then proceeds from step 23' onward, i.e. the interval to the reception of the next call packet is defined. If the control packet is put in the queue because there are already other control packet in the queue, the packet is retrieved 26 for transmission when it is checked 26, after the transmission 25 of the preceding control packet, whether the control packet queue is empty, and the routine then proceeds from step 23' onward, i.e. the interval to the reception of the next call packet is defined. The method thus takes care that no packets remain in the control packet queue.

When there are several transmission channels on which packets are sent, the above-mentioned arrival rate of the call packets can be maintained channel-specifically if the packets associated with one and the same call or other data transmission connection are always sent on the same transmission channel. To speed the transmission of the control packets, it is possible to look for a channel on which there is enough time to send the control packets. The duration of the transmission of a control packet is first calculated, as described above in connection with FIGS. 2 and 3. With reference to the description of FIG. 2, for example, the channels can then be monitored one at a time, looking for a channel on which the interval to the reception of the next call packet is at least equal to the duration of the transmission of the control packet. If such a channel is found, the control packet will be sent on it. If all the channels are monitored and no such channel is found, the control packet is put in the queue to wait for the transmission of the next call packet. When a call packet has been sent on a channel, the emptying of the control packet queue will be started by checking one channel at a time. The advantage is that the control packets can be forwarded faster than when the control packets are sent on a certain channel.

With reference to the different treatment of packets in FIGS. 2 and 3 and the description of the figures, depending on whether the packets are call packets or control packets, the same division could also be effected by separating the speech-containing speech packets from the other packets, whereby the speech packets would be treated in the same way as the call packets in FIGS. 2 and 3, i.e. immediate transmission after the reception would be guaranteed only for the speech packets. Both the control packets and the data-containing call packets would then be treated in the same way as the control packets in FIGS. 2 and 3, i.e. they would be transmitted between the speech packets whenever there is enough time. The packets can also be divided into control, speech and data packets, whereby the speech packets are treated in the same way as the call packets, and the data packets are given priority over the control packets, i.e. they have a higher priority. It is also possible to divide the packets generally into control packets and call packets, but in the case of congestion to divide the call packets into speech packets and data packets, so that different types of packets can be treated differently. If real-time image is transferred in the network, the image packets can be compared to speech packets and treated in the same way.

Figure 4:
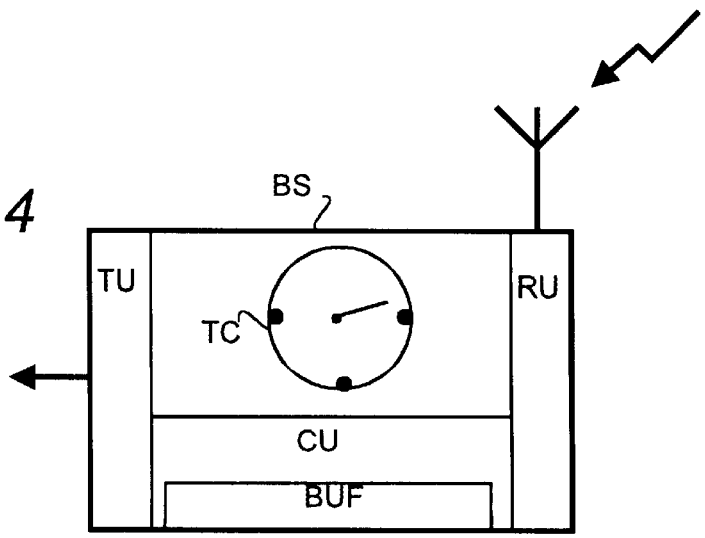
FIG. 4 is a block diagram of a first preferred embodiment of a network node according to the invention.

FIG. 4 illustrates a network node according to the invention. The network node, described by way of an example, is here a base station BS of a system according to the TETRA standard. The node can also be any other network node that contains at least so much intelligence that it will not transmit the packets it has received back in the same direction. The node of the invention need not process the packet in any way; all it has to do is to receive the packets at a certain rate and forward them. For the sake of illustration, one incoming channel, which is a carrier wave of the radio path, leads here to the network node and one outgoing channel leads from it. The only restriction in the number of outgoing and incoming channels of the network node of the invention is that there must be at least one incoming and one out going channel. There is no upper limit for the number of channels, nor are there any requirements for the transmission path used. The network node BS also comprises a transmission unit TU for transmitting packets to the network. The transmission unit TU can also receive packets from the network. The network node BS also comprises a reception unit RU for receiving packets from the transmission path—here the radio path—in which packets are transmitted on the carrier wave, and for processing the packets so that they are ready for transmission on the transmission path of the network. The reception unit RU can also transmit packets on the carrier wave. The reception unit RU is arranged to separate the call packets from the control packets that contain signalling information between the network elements of the data transmission network. It can separate the packets on the basis of the identification data contained in the packet or on the basis of something else, such as information indicating that signalling is transmitted on the carrier wave at certain periods. The reception unit of the network node of the invention can also receive packets from other network nodes or from other networks, and it need not necessarily process the packets.

The network node comprises a time counter TC, which defines how much time there is left before the reception of the next call packet. This time is called an interval. To define the interval, the counter needs to know the arrival rate of the packets, the rate being preferably stored in the time counter TC. The information on the arrival rate can also be stored in some other way and in some other place, for example in the memory of the network node BS. The terms 'arrival rate' and 'received packet' have been described above in connection with FIG. 2. The time counter TC monitors the arrival rate preferably cyclically, whereby any changes in the allocation or load situation on the incoming channel can be taken into account. The arrival rate can also be constant. For example in systems using the TDMA method, the length of a cycle is preferably set to be the same as the duration of a frame, for the arrival rate of the packets at least at the base station follows the allocation situation of the time channels. For example in a system of the TETRA standard, about 15 ms are allocated for each packet on the radio path, so when all the time slots of the radio path are allocated, the arrival rate of the packets at the base station is about 15 ms. When the payloads of the packets on the radio path are 274 bits and 432 bits, and the identification data needed in the transmission network can be presented, for example by 56 bits, the packet sizes are 330 bits and 488 bits. When the packet size is 488 bits, the transmission of a single call packet on a 64 kbit/s transmission channel takes about 7.6 ms, and so there are about 7.4 ms to send control packets before the reception of the next call packet. If a time slot is deallocated, the arrival rate changes in accordance with what is presented in FIG. 4, i.e. the length of one interval is about 30 ms and that of the others is about 15 ms. Thereby there is more time for the transmission of the control packets at one point of the cycle.

The information on the arrival rate can be applied, for example, in the CDMA method so that a cycle of the duration of a frame consists of a period in which a flow of successive call packets arrives, and the rest of the cycle can then be used to transmit control packets. The duration of the flow of call packets depends on the allocation situation of the channels on the radio path.

A network node also comprises a control unit CU, which manages the resources of the network node. The control unit CU can also take care of the configuration of the network node and function as the interface of the network node to the network management system. To buffer the control packets waiting for the transmission, the control unit CU comprises a buffer BUF. The buffer BUF can also be arranged in other units in the network node or it can be a separate module. The control unit CU controls the transmission of the packets through the transmission unit TU so that control packets are sent only when they can be sent in full before the reception of the next call packet. The control unit CU therefore calculates the duration of the transmission of the control packet to be transmitted next, checks the interval to the reception of the next call packet from the time counter TC in the network node, and compares the times. If the control packet can be sent so that it does not slow the transmission of the call packet, i.e. the interval is longer than the duration, then the control unit CU requests the transmission unit TU to send the control packet. Otherwise the control unit CU puts the control packet in the buffer BUF to wait until the next call packet has been received and transmitted. After the transmission of the call packet, the control unit CU can retrieve a control packet from the queue and take care that the transmission unit TU sends the control packet, if there is enough time to send it before the reception of the next call packet. The control unit CU can retrieve control packets from the queue in the order of arrival or priority or look for the first packet for the transmission of which there is enough time before the transmission of the next call packet. The control unit CU can also put control packets in the transmission queue in the buffer in accordance with the priority of the packets. The priorities ensure that the important control packets are sent as quickly as possible.

The control unit CU of the network node according to the invention can also function as the interface of the network node BS to the network management system. The control unit CU can replace the arrival rate with a new arrival rate received from the network management system. The arrival rate is preferably updated always when the allocation situation on the incoming channel changes, for example when a time interval on the radio path is deallocated or allocated. This ensures that the network node will not unnecessarily slow the transmission of the control packet by waiting for a packet of a certain time slot when there is no such packet. The network node can also itself manage the allocation situation and synchronization on the incoming channel, whereby the control unit CU of the network node takes care that always when the allocation situation changes, the arrival rate is updated. The allocation situation on the incoming channels of the network node can also be managed in other network elements, for example, in a base station controller. The information on the new arrival rate is then received from there.

Control packets generated by the network node of the invention are treated in the same way as the received control packets, i.e. they are transmitted only when there is enough time to send them before the reception of the next call packet.

For the functions of the control unit CU, the network node can also comprise different means, such as processing means, for storing the information on the arrival rate and for putting the control packets in the buffer. The above functions can also be divided differently between the different elements of the network node, for example the control unit CU can divide the packets into control packets and call packets.

The figures and the description of the figures are only intended to illustrate the present invention and its application to a mobile system it will be obvious to those skilled in the art that the invention can be varied and modified in many ways without deviating from the scope and spirit of the invention as disclosed in the attached claims.

What is claimed is:

1. A method for packet-switched data transmission in a data transmission network comprising at least one network node for receiving and transmitting packets, call packets being separated from control packets that contain signalling information on the data transmission network in the network node, the method comprising:

maintaining information on an arrival rate of the call packets;

calculating a duration of transmission of the control packet that is to be sent next;

defining an interval to reception of a next call packet;

comparing the duration with the interval, and if the duration is shorter than or equal to the interval, transmitting the control packet, and if the duration is longer than the interval, putting the control packet in a transmission queue, waiting until the call packet has been received, and subsequently forwarding the call packet substantially immediately.

2. The method according to claim 1, further comprising the control packet is put in the queue in a position defined by a priority contained in the control packet so that control packets having a higher priority are given priority over control packets having a lower priority in the transmission queue, and control packets having a same priority are put in order of arrival.

3. The method according to claim 1, further comprising after transmission of the call packet, retrieving a first packet from a transmission queue of control packets;

calculating a duration of transmission of the control packet;

defining an interval to reception of a next call packet;

comparing the duration with the interval, and if the duration is longer than the interval, putting the control packet back in the transmission queue, and if the duration is shorter than or equal to the interval, transmitting the control packet;

checking whether there are control packets in the queue, and if there are packets in the queue, repeating steps of the method beginning where the first packet is retrieved from the transmission queue of control packets.

4. The method according to claim 1, further comprising after transmission of the call packet, calculating an interval to reception of a next call packet;

retrieving from the transmission queue of control packets, a first packet for transmission wherein the interval is sufficiently long;

transmitting the control packet;

checking whether there are control packets in the transmission queue, and as a result of checking, if there are packets in the queue, repeating steps of the method beginning where an interval to reception of a next call packet is defined.

5. The method according to claim 1, further comprising:

transmitting call packets associated with a same data transmission connection on a same channel when at least two outgoing channels lead from the network node, maintaining information on an arrival rate of call packets separately for each available outgoing channel, defining an interval to reception of a next call packet channel-specifically, comparing a duration of a received control packet with every interval in turn, until an interval that is longer than or equal to the duration is found, whereby the control packet is transmitted on a channel concerned, or the duration has been compared with every interval, after which the control packet is put in the transmission queue.

6. A network node of a packet-switched data transmission network to which there leads at least one incoming channel and from which there leads at least one outgoing channel, the node comprising reception means for receiving packets, transmission means for transmitting packets toward a destination address, and a buffer for buffering received packets, and the reception means being arranged to separate call packets from control packets that contain signalling information on the data transmission network, the node further comprising:

- memory means for storing information indicating an arrival rate of the call packets,
- a time counter for defining an interval to reception of a next call packet,
- calculating means for calculating a duration of transmission of the control packet that is to be sent next,
- comparison means for comparing the interval and the duration, and
- a transmission order controller for putting control packets in a transmission queue in the buffer and for transmitting the next call packet next, if the duration is longer than the interval.

7. The network node according to claim 6, further comprising the memory means being arranged to update an arrival rate in response to a new arrival rate received from the data transmission network.

8. The network node according to claim 6, further comprising the transmission order controller being arranged to put control packets received in the node in the transmission queue in the buffer in an order indicated by a priority contained in the packet.

9. The network node according to claim 6, further comprising the transmission order controller being arranged to retrieve a control packet from the transmission queue in response to transmission of the next call packet, and the transmission means being arranged to transmit the control packet if an interval to reception of a next call packet is longer than or equal to a duration of transmission of the control packet.

* * * * *